United States Patent [19]

Cognet et al.

[11] Patent Number: 5,334,427
[45] Date of Patent: Aug. 2, 1994

[54] STAMPABLE REINFORCED THERMOPLASTIC SHEET AND ARTICLES OBTAINED FROM SAID SHEET

[75] Inventors: Gilles Cognet, Bernay; Régis Jacquemet, Evreux; Véronique Lamblin, Reims, all of France

[73] Assignee: Elf Atochem S.A., Puteaux, France

[21] Appl. No.: 989,380

[22] Filed: Dec. 11, 1992

[30] Foreign Application Priority Data

Dec. 13, 1991 [FR] France ............... 91 15532

[51] Int. Cl.$^5$ .............. B29C 43/20; B29C 51/14; B29K 105/16; B29L 9/00; B32B 5/28
[52] U.S. Cl. ............................ 428/34.5; 156/222; 264/108; 264/319; 264/324; 264/331.11; 264/331.19; 264/331.21; 428/34.7; 428/283; 428/285; 428/297; 428/303; 428/340
[58] Field of Search ............... 156/222; 264/108, 319, 264/324, 331.11, 331.19, 331.21; 428/34.5, 283, 285, 297, 303, 340

[56] References Cited

U.S. PATENT DOCUMENTS

| | | |
|---|---|---|
| 3,850,723 | 11/1974 | Ackley . |
| 4,044,188 | 8/1977 | Segal . |
| 4,098,943 | 7/1978 | Degginger . |
| 4,269,884 | 5/1981 | Della Vecchia . |
| 4,379,802 | 4/1983 | Weaver . |
| 4,469,543 | 9/1984 | Segal et al. . |
| 4,716,072 | 12/1987 | Kim . |

FOREIGN PATENT DOCUMENTS

| | | |
|---|---|---|
| 0013089 | 7/1980 | European Pat. Off. . |
| 0461965 | 12/1991 | European Pat. Off. . |
| 2325504 | 4/1977 | France . |
| 826012 | 12/1959 | United Kingdom . |
| 1342147 | 12/1973 | United Kingdom . |

*Primary Examiner*—James C. Cannon
*Attorney, Agent, or Firm*—Burns, Doane, Swecker & Mathis

[57] ABSTRACT

Stampable reinforced thermoplastic sheet, at least one face of which comprises, from the outside to the inside, at least three successive layers abc, in which:

a is a matrix comprising a thermoplastic resin reinforced by at least two fillers of different nature and/or type chosen from fillers of the lamellar type and of the spherical or substantially spherical type, b is an interfacial binder chemically compatible with the thermoplastic resin of a and having, with respect to the latter, a lower viscosity at the temperatures at which the sheets are produced and used, and c is a reinforcement comprising a needled glass mat.

Articles obtained from the sheets by stamping.

22 Claims, 1 Drawing Sheet

STAMPABLE REINFORCED THERMOPLASTIC SHEET AND ARTICLES OBTAINED FROM SAID SHEET

The present invention relates to stampable reinforced thermoplastic, or SRT, sheets which permit the production of moulded articles by stamping, and in particular of visible parts for, for example, the automotive industry.

The production of SRT parts having, at one and the same time, a good surface appearance, good dimensional stability and a mass per unit surface area which can be up to 5 kg/m$^2$ involves great difficulties.

SRT has been relatively little used in industry to date because of the poor appearance of the parts obtained, restricting their use to parts which are hidden or covered by carpeting or fabrics.

One of the reasons for this inadequate quality of appearance is the difficulty in impregnating glass mats (the mass per unit surface area of which may be up to 900 g/m$^2$) with thermoplastic resin (the viscosity of which in the molten state is generally very high).

The present invention makes it possible to overcome this obstacle and to provide an SRT sheet structure for visible parts, the dimensional stability of which is improved at the same time.

More particularly, the present invention relates to a stampable reinforced thermoplastic sheet, at least one face of which comprises, from the outside to the inside, at least three successive layers abc, in which:

a is a matrix comprising a thermoplastic resin reinforced by at least two fillers of different nature and/or type chosen from fillers of lamellar type and of spherical or substantially spherical type, the viscosity of which, measured using a capillary viscometer, at the temperatures at which the sheets are produced and used, and at a shear rate of 20 s$^{-1}$, is between 450 and 2000 Pa.s;

b is an interfacial binder chemically compatible with the thermoplastic resin of a, the viscosity of which, measured under the same conditions as that of the matrix a, is between 10 and 350 Pa.s, and c is a reinforcement consisting of a needled glass mat.

The matrix a has the minimum possible coefficient of linear thermal expansion, in order to reduce the matrix-/glass mat differential shrinkage during cooling of the material after release from the mould.

The SRT matrix according to the invention may contain any type of thermoplastic resins, to their own in the form of a mixture and/or copolymerised, amongst which resins the following may be mentioned:

polyester resins, such as polyethylene terephthalate (PET) and polybutylene terephthalate (PBT), polyamide resins, such as the aliphatic polyamides PA-6, PA-6/6, PA-11, PA-12 and PA-12/12, their mixtures and/or their copolymers, polyolefin resins, on their own, in the form of a mixture and/or copolymerised, such as polypropylene (PP), polyethylene (PE) and polymethylpentene, aromatic polysulphone resins, such as polysulphone and polyallyl sulphone, polyester polyacetal sulphone resins, polycarbonate resins, polyether-imide resins, polyester-ketone resins, ABS resins, and acrylic resins.

Amongst the preferred thermoplastic resins, the resins based on PP, PET or PBT, the mixtures or alloys based on PP/PA-6 or PP/PA-6.6 and, in particular, those described in French Patent Application 2 629 090 will be mentioned very particularly.

It is also possible to incorporate in these resins diverse additives such as antioxidants, anti-UV agents, flame retardants, plasticisers, dyes, pigments, antistatic agents, heat stabilisers and the like.

The percentage of resins is generally between 30 and 80 % of the total weight of the SRT and/or between 53 and 90 % of the total volume of the SRT.

The reinforcing fillers according to the invention are (inorganic) fillers of lamellar type or of spherical or substantially spherical type. In general, they have an average particle size of less than r equal to 80 μm and preferably of between 1 and 40 μm.

The fillers of lamellar type used in the invention are of diverse nature and comprise, in particular, mica, wollastonite and whiskers (shape ratio varying from 30 to 300).

The fillers of spherical or substantially spherical type used in the invention are of diverse nature and comprise, in particular, talc, solid or hollow glass beads and $CaCO_3$.

Preferably, the thermoplastic resin of the matrix a is reinforced by at least three fillers, at least one of which is of a nature and/or type different from that (those) of he other fillers.

The percentage of reinforcing fillers is generally between 14 and 50% of the total weight of the SRT and-/or between 6 and 40% of the total volume, and preferably between 27 and 35% of the total volume.

The thickness of the layer of matrix a is between 0.3 and 1.5 mm and preferably between 0.5 and 0.7 mm.

The use of an interfacial binder b, chemically compatible with the matrix a and more fluid then the latter at the temperatures at which the SRT sheet is produced and used, results in an improvement in the mechanical properties and in the surface appearance of the finished SRT part.

The chemical compatibility of the interfacial binder b with respect to the matrix a may be obtained by a binder which is of a chemical nature identical to (or close to) that of the thermoplastic matrix a.

The essential functions of the binder comprise wetting, impregnation of the glass mat of the layer c, dispersion of the glass fibers of this layer and adhesion of the interface between the matrix a and the glass fibers.

The use of a fluid binder b suppresses segregation of glass fibers (dry fibers) in the flow zones of the material and facilitates entrainment of the glass fibers by the thermoplastic resin during stamping. An improved surface appearance and a better dimensional stability of the stamped parts are thus obtained.

On the other hand, the thickness of the interfacial binder layer b is preferably as small as possible, while remaining sufficient to obtain the desired wetting and impregnation of the glass mat, and the desired interfacial adhesion between the matrix a and the glass mat c.

In fact, the Applicant has found that a reduction in the thickness of the binder film makes it possible to improve the surface appearance of the parts, by reducing the differential between the coefficients of linear thermal expansion of the matrix a and the interfacial binder b - glass mat c assembly.

The reinforcement c is a needled glass mat. The glass mat comprises glass fibers which are randomly distributed in the plane; conventionally each of the glass filaments is oiled, which ensures gluing of the filaments of a single fiber. The fibers are connected to one another by means of a binder, the chemical nature of which may preferably be, but is not necessarily, identical to (or close to) that of the interfacial binder b.

The needling of the glass mat makes it possible to improve its flowability and the impregnation of the glass fibers by the thermoplastic resin.

The mats most frequently encountered comprise cut fibers having an average length of about 50 mm. According to the present invention it is possible to use a mat comprising continuous yarns or filaments of UNIFILO ® type with needling, which may, for example, be obtained in accordance with French Patent Application 2,617.208.

In general, it is possible to use a mat having a mass per unit surface area of between 225 and 900 g/m$^2$, and preferably of between 300 and 600 g/m$^2$.

The mass per unit length of the mat may vary, in general, between 10 and 125 tex for threads which have an average diameter of preferably between 5 and 30 μm and advantageously a needled mat having a mass per unit length of between 10 and 25 tex and an average diameter of between 10 and 20 μm is used.

The percentage of glass mat within the SRT is generally between 15 and 40% of the total weight of the SRT and/or between 8 and 20% by volume and preferably between 8 and 12% of the total volume of the SRT.

According to a preferred embodiment of the invention, the two faces of the SRT sheet comprise, from the outside to the inside, at least three successive layers abc.

According to another embodiment of the invention, the SRT sheets comprise one or more thicknesses of a structure comprising four successive layers abca or five successive layers abcba.

The process for the production of the SRT sheets uses a conventional technique for the production of multilayer products, adapted to the characteristics of the invention; it generally proceeds in accordance with the following steps:

thermoplastic resins, in which the reinforcing fillers and, optionally, diverse additives are incorporated, are compounded, the compounded resin is then converted into sheet form, the sheet having a thickness of, in general, between 0.3 and 1.5 mm and preferably between 0.5 and 0.7 mm, and a two-layer thermoplastic matrix a/interfacial binder b sheet is then produced by a co-extrusion process or by coating the binder on the matrix sheet. The binder b is then positioned on the glass mat c side.

The SRT sheet is then laminated. The assembly is preheated, for example by conduction, to a temperature higher than the melting point of the thermoplastic resin(s) and is then subjected to a pressure generally of the order of 3 to 10 bars in order to impregnate the mat, an approximately 10% flow of the material being observed.

An SRT sheet according to the invention is thus obtained.

This sheet is a semifinished product which may then be converted into moulded articles of more or less complex shape by a stamping process known per se. Stamping may be effected on a predetermined shape cut from a SRT sheet according to the invention, or on several such superposed shapes.

The invention also relates to the moulded articles and parts obtained by stamping one or more SRT sheets according to the invention, at least one of the surfaces of these articles and parts comprising, from the outside to the inside, at least three successive layers abc, as defined above.

The temperature of the mould is controlled during stamping, which may depend on the nature of the thermoplastic resin(s) used.

By way of illustration, the temperature is between 30° and 90° C. for resins based on polypropylene and is between 100° and 160° C. for resins based on polyester (PET, PBT).

The moulded articles according to the invention may be used in numerous fields as visible parts. The following possible applications may be mentioned by way of example:

in the automotive sector for the production of, in particular, bonnets, doors, bumper reinforcements, rocker covers, clutch box casings, seat frames, battery supports, armrests, anti-noise shields and the like, for the production of parabolic antennas and for the production of suitcases, trunks and musical instrument cases.

In the examples which follow, the following are assessed:

the mechanical characteristics of the SRT by measuring the 3-point bending strength in accordance with ISO standard 178, the surface appearance of the SRT in the solidification zone of the material is evaluated on the basis of the profile criteria R (standard E 05 015) and W and determination of the Ashland index $I_A$, used in French cars, R corresponds to the amplitude of the microroughness of the material (that is to say to the geometrical irregularities such that the distance between 2 peaks of these irregularities is between 0 and 500 μm) and is equal to the difference in height "z" between the maximum peak and the minimum hollow taken over a step of less than 500 μm, W corresponds to the undulation of the material (that is to say to the geometrical irregularities such that the distance between 2 peaks of these irregularities is between 1 and 4 cm) and is equal to the difference in height between the maximum peak and the minimum hollow taken between 1 and 4 cm, and the Ashland index $I_A$ expresses the deformations of the long wavelengths (between 6 nun and 10 cm), which are quantified by a surface analyser which operates on the following principle.

A laser system scans the surface to be analysed by 21 successive lines (surface area: 25.4 cm×25.4 cm = 10 inch×10 inch).

The image of these lines is reflected by the part on a screen and then captured by a video camera and digitalised by a microcomputer.

For each line the computer calculates the third order polynomial which best follows the digitalised image and then calculates the average divergence (200 points per line) between this polynomial and the digitalised image.

These 21 average divergences are then added and corrected by a calibration factor to determine the Ashland index ($I_A$).

The surface appearance of the SRT in the flow zone of the material is assessed on the basis of a visual grading.

The various gradings of the surface appearance are:

| | |
|---|---|
| excellent appearance: | no glass fibres visible on the surface of the part (surface appearance identical to the solidification zone of the material). |
| good appearance: | the visible glass fibres correspond to 20% of the surface area of a zone under consideration. |
| average appearance: | the visible glass fibres correspond to 50% of the surface area of a zone under consideration. |
| poor appearance: | the visible glass fibres correspond to 80% of the surface area of the zone under consideration. |

The figures show multi-layer structures in section. Only FIGS. 1 and 5 correspond to structures in accordance with the present invention.

FIG. 4 shows a nine-layer structure aa'cdcdca'a, which will be termed type 4 and in which a' is a thermoplastic layer which contains a filler but has a composition differing from that of a.

The following Examples 6, 7 and 8 using, respectively, structures of type 3, 2 and 4, compared with Examples 1 to 4 on the one hand and 5 on the other hand, using, respectively, structures of types 1 and 5, show that the latter, which are in accordance with the present invention, make it possible to obtain a better surface appearance and better mechanical properties.

The following examples illustrate the invention.

EXAMPLES 1

The teaching of this example is multi-faceted. In Examples 1A to 1D the compositions of the matrix layer a are varied and two compositions of the layer of matrix a are taken, and two compositions are taken which are better with respect to the mechanical properties and to the surface appearance which they make it possible to obtain: compositions F$\phi$ and F1, according to the present invention.

Examples 1C, 1E, 1F, 1H and 1I differ only in respect of the thickness of the layer of binder b, which is even omitted in Sub-Example 1H, whilst Example 1G relates to a layer of matrix a on its own.

A thermoplastic resin based on PP and one or more reinforcing fillers are compounded in a single-screw BUSS co-kneader after having prepared a premix of the dry constituents in a drum. The temperature of the kneader is controlled at 200° C.

The thermoplastic resin is a PP which has a melt index MI of 40 determined in accordance with ASTM standard D 1239 (at 230° C. under 2.16 kg).

According to Examples 1A to 1I, one or more reinforcing fillers (mica, solid glass beads (sGB), talc or CaCO$_3$) are added in the proportions indicated in the table. This mixture constitutes the matrix.

The mica used has an average particle size of 30 to 40 μm with a form factor of 30-50.

The sGB used have an average particle size of 15 to 20 μm.

The CaCO$_3$ used has an average particle size of 1.1 μm.

The talc used has an average particle size of 3 to 5 μm.

Once compounded, the matrix a of Examples 1A to 1F is then coextruded with an interfacial binder b based on maleated PP (MI=400° at 230° C. under 2.16 kg; degree of maleation by weight: 5000 ppm) in a SAMA-FOR 60/28D extruder.

A two-layer sheet is obtained in which the thickness of the matrix layer is 0.65 nun and the thickness of the binder layer is 0.1 mm for Examples 1A to 1D.

For Examples 1E, 1F, 1H and 1I, the thickness of the binder layer is, respectively, 0.14 mm, 0.07 mm, 0 mm and 0.03 mm.

Figure 1:
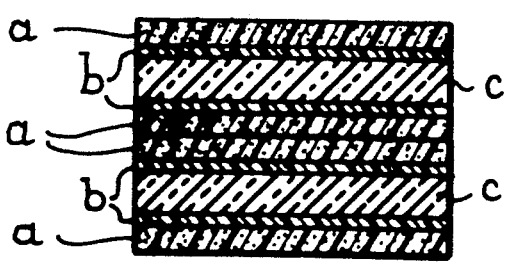
FIG. 1 shows a ten-layer structure abcbaabcba, a, b and c being as defined above, which is also the case for the other figures. This structure will be termed type 1 below.

An SRT structure of type 1, shown in FIG. 1, according to the invention, which is made up of 4 two-layer sheets ab as described above, between which two needled glass mats C are arranged on the side of the layer of interfacial binder b, is then laminated. The UNIFILO needled mat (needle no. 6) (mass per unit surface area:450g/m$^2$); mass per unit length: 25 tex) is prepared by the process of French Application 2.617.208 using the following needling conditions:

speed of advance of the mats 2 m/min
depth of penetration of the needles: 26 mm
number of strokes/cm$^2$: 7.3
strike rate: 150 strokes/min.

The assembly is preheated by conduction between the plates of a press at 220° C. for 3 min under a pressure of 1 bar and is then compressed at the same temperature under 6 bars for 30 s.

The SRT sheet thus obtained has a thickness of 3.6 mm.

The SRT sheet is then cut and then preheated by conduction between the plates of a press at 225° C.

Three discs 300 mm in diameter are cut from the SRT sheet preheated in this way and stacked in an OBJET-TYPE mould 500 mm in diameter, the temperature of which is controlled at 60° C., where the part having a thickness of 3 mm is kept for 40 s under a pressure of 200 bars.

The mechanical properties of the SRT parts of Examples 1A to 1I are determined and their surface appearance is determined as indicated above, and the same determinations are carried out on a part produced solely with the matrix (identical composition) of Example 1C, which serves as reference from the standpoint of surface appearance (Example 1G).

The results are collated in the table (Examples 1A-I).

The thermoplastic matrices F$\phi$ and F1 according to the invention give the best results (Examples 1A to 1D).

On the other hand, the finished part based on matrix F1 and glass mat has better mechanical properties than a layer of matrix F1 on its own (Example 1G compared with 1C, 1E, 1F, 1H and 1I), and the reduction in the thickness of the interfacial binder layer from 140 to 70 μm (Examples 1E, 1C and 1F) results in an improvement both in the mechanical properties of the finished moulded part and in its surface appearance; in contrast, for a thickness of 30 μm (Example 1I), mechanical properties similar to those obtained with a thickness of 70 μm, but a deterioration in the surface appearance, are observed; in the absence of binder (Example 1H) the deterioration is significant at all levels with respect to Example 1C, 1E, 1F and 1I. It therefore appears in the present case that the optimum thickness is close to 70 μm.

EXAMPLES 2

Compared with Example 1D, only the nature of the interfacial binder b has been modified. Thus, Example 2A uses a binder b which is chemically compatible with the resin but is too viscous, whilst Example 2B describes a binder which is fluid but not chemically compatible with the resin a.

The best characteristics are obtained with Example 1D according to the invention.

SRT parts in which the thermoplastic resin is based on polypropylene of MI=40 are produced under the same conditions as described in Example 1.

The thermoplastic resin is reinforced with several reinforcing agents (matrix Fφ described in the table).

The structure of the SRT sheet is of type 1.

The needling conditions for the UNIFILO glass mat used are identical to those for the mat of Examples 1.

Part 2A is produced from a maleated PP binder (MI=11 at 230° C.; 2.16 kg; proportion of maleation by weight: 1500 ppm), the thickness of which is 0.1 mm.

Part 2B is produced from a EVA binder (MI=500 at 230° C.; 2.16 kg; proportion of vinyl acetate: 18%), the thickness of which is 0.1 mm.

The results are collated in the table.

Comparison of Example 2A with Example 1D shows that the use of an interfacial binder which is viscous, although chemically compatible, in this case gives rise to a slight deterioration in the mechanical properties and a significant degradation of the surface appearance.

The deterioration in these properties is even more pronounced in the case of an interfacial binder which is fluid but not chemically compatible (Example 2B).

EXAMPLES 3

Compared with Example 1D, only the type of needling is modified. This example demonstrates the better suitability of needling no. 6, used in Example 1D, for implementation of the invention.

SRT parts in which the thermoplastic resin is based on polypropylene of MI=40 are produced under the same conditions as described in Examples 1 and 2 (SRT structure of type 1). The thermoplastic resin is reinforced with several reinforcing agents (matrix Fφ described in the table).

The part of Example 3A is produced from a needled mat (mass per unit surface area 450 g/m²; mass per unit length 25 tex) (needle no. 1), the conditions for the production of which are defined below:
  speed of advance of the mat: 2.4 m/min
  depth of penetration of the needles: 26 mm
  number of strokes/cm²: 11
  strike rate: 150 strokes/min.

The part of Example 3B is produced from a needled mat (mass per unit surface area 450 g/m²; mass per unit length 25 tex) (needle no. 4), the conditions for the production of which are defined below:
  speed of advance of the mat: 1.4 m/min
  depth of penetration of the needles: 30 mm
  number of strokes/cm²: 18
  strike rate: 150 strokes/min.

The part of Example 3C is produced from a standard (non-needled) UNIFILO mat (mass per unit surface area 450 g/m²; mass per unit length 25 tex).

The results are collated in the table.

Comparison of Examples 1D, 3A, 3B and 3C makes it possible to establish the following classification from the glass mat most suitable for carrying out the present invention to the least suitable glass mat:

needle no. 6>needle no. 1>needle no. 4>nonneedled standard.

EXAMPLE 4

Compared with the other examples, Example 4A uses a thermoplastic matrix a based on PET, which also enables very good mechanical characteristics and surface appearance to be obtained.

A thermoplastic resin based on PET and several reinforcing fillers are compounded in a single-screw BUSS co-kneader after having prepared a premix of the dry constituents in a barrel. The temperature of the kneader is controlled at 280° C.

The thermoplastic resin is a PET which has an intrinsic viscosity of 0.81 (determined for 150 g of PET in 30 g of dichloroacetic acid).

Once compounded, the matrix, the composition of which is described in the table, is then coextruded with a binder based on PET (of the same chemical nature as the resin) in a SAFAFOR 60/28 D extruder.

A two-layer sheet is obtained, in which the thickness of the matrix layer is 0.65 mm and the thickness of the binder layer is 0.13 mm.

An SRT structure of type 1 according to the invention is then laminated as described in Example 1.

The needled glass mat (mass per unit surface area: 450 g/m²; mass per unit length: 25 tex) (needle no. 6) is produced under the same conditions as the mat of Examples 1 and 2.

The assembly is preheated by conduction between the plates of a press at 270° C. for 4 min, under a pressure of 1 bar, and then compressed at the same temperature under 6 bars for 30 s.

The SRT sheet is then cut and then preheated by conduction between the plates of a press at 270° C.

Three discs 300 mm in diameter are cut from the SRT sheet preheated in this way and stacked in a circular OBJET-TYPE mould 500 mm in diameter, the temperature of which is controlled at 150° C., where the part, which has a thickness of 3 mm, is held for 60 s under a pressure of 200 bars.

The results, which are collated in the table, show that the use of a matrix a based on PET also enables satisfactory characteristics to be obtained.

EXAMPLE 5

Example 5A uses a different structure according to the invention, namely a structure of type 5, which, like the structure of type 1, enables satisfactory characteristics of the finished SRT part to be obtained.

SRT parts are produced from a matrix comprising a thermoplastic resin based on polypropylene of MI=40 and reinforced by several reinforcing agents (matrix composition F1 described in the table—identical to Example 1C ).

Figure 5:
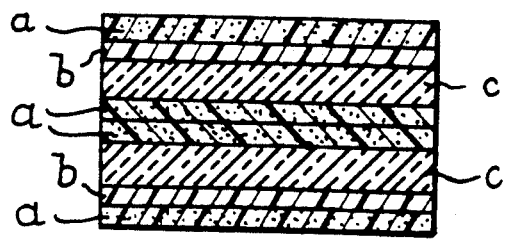
FIG. 5 shows an eight-layer structure abcaacba, which will be termed type 5.

The structure of the SRT sheet is of type 5 shown in FIG. 5.

The layers a comprise a sheet of matrix F1, the thickness of which is 0.65 mm.

The layers b comprise a malested PP film (MI=400 at 230° C.; 2.16 kg; proportion of maleation by weight: 5000 ppm), the thickness of which is 0.2 mm.

The layers c comprise a needled glass mat (needle no. 6) (mass per unit surface area: 450 g/m²; mass per unit length 25 tex), which is identical to the mat of Example 1C.

The conditions for hot laminating of the SRT structure and the conditions for transformation of the part are identical to those of Example 1.

The results are collated in the table.

The SRT structure of type 5 according to the invention gives satisfactory results.

EXAMPLE 6

This Example 6A, like the following Examples 7A and 8A, shows the superiority of the structures of types 1 and 5 according to the invention over, respectively, the structures of types 3, 2 and 4.

SRT parts are produced from a matrix (termed F1), the composition of which is identical to Example 1C (table).

Figure 3:
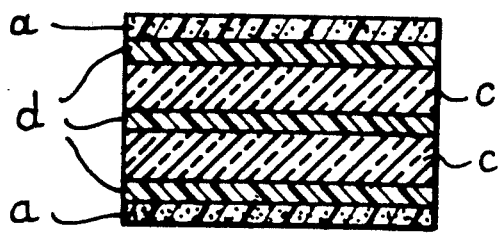
FIG. 3 shows a seven-layer structure adcdcda, which will be termed type 3 and in which d is a thermoplastic layer containing no filler, which is also the case in FIG. 4.

The structure of the SRT sheet is of type 3 shown in FIG. 3.

The layers a comprise a sheet of matrix F1, the thickness of which is 0.65 mm.

The layers d comprise a sheet of base PP of MI=40, which has a thickness of 0.65 mm.

The layers c comprise a needled glass mat which is identical to that of Example 1C.

The results are collated in the table.

The SRT structure of type 3 gives less good results than the SRT structures of types 1 (Example 1C) and 5 (Example 5A).

EXAMPLE 7

SRT parts are produced from a matrix (termed F1) which has a composition identical to that of Example 1C.

Figure 2:
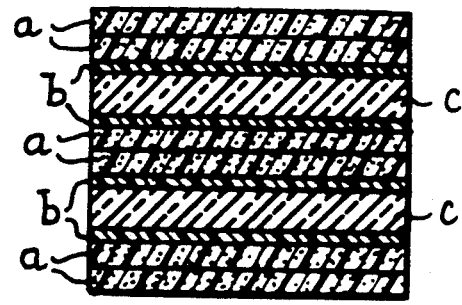
FIG. 2 shows a twelve-layer structure aabcbaabcbaa, which will be termed type 2.

The structure of the SRT sheet is of type 2 shown in FIG. 2.

The layers a comprise a sheet of matrix F1, the thickness of which is 0.65 mm.

The layers b comprise a film of maleated PP binder (MI=400° at 230° C.; 2.16 kg; proportion of maleation by weight—5000 ppm), the thickness of which is 100 ppm.

The layers c comprise a needled glass mat which is identical to that of Example 1C.

The results are collated in the table. The SRT structure of type 2 gives less good results than the SRT structures of types 1 (Example 1C) and 5 (Example 5A).

EXAMPLE 8

Figure 4:
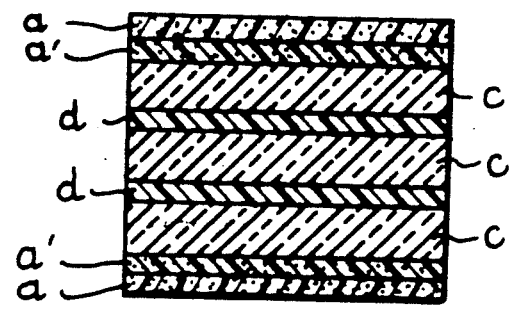

SRT parts are produced from a matrix (termed $F\phi$), the composition of which is identical to that of Example 1D. The structure of the SRT sheet is of type 4 shown in FIG. 4. The layers a comprise a sheet of matrix $F\phi$, the thickness of which is 0.65 mm.

The layers a' comprise a thermoplastic resin reinforced by solid glass beads (composition defined in the table and process conditions identical to those for matrix $F\phi$ or F1), in which the thickness of the sheet is 0.65 mm.

The layers c comprise a needled glass mat which is identical to that of Example 1D.

The layers d comprise a sheet of base PP, MI=40 at 230° C.; 2.16 kg, the thickness of which is 0.65 mm.

The results, given in the table, are less good than in the case of SRT structures of types 1 (Example 1D) and 5 (Example 5A).

TABLE

| | SRT COMPOSITION | | | | | | SURFACE APPEARANCE | | | |
| | COMPO- | INTER- | | | | | Solidification zone | | Flow zone | |
| | SITION | FACIAL | | STRUC- | 3-POINT BENDING | | R | W | | Visual |
| Ex | Matrix a | BINDER b | GLASS MAT c | TURE | E (MPa) | $\sigma R$ (MPa) | ($\mu$m) | ($\mu$m) | $I_4$ | evaluation |
| 1A | 100% PP | PPm (t = 100 $\mu$m) | UNIFILO needle no. 6 | TYPE 1 | 3500 | 110 | 1.6 | 16 | 350 | GOOD |
| 1B | 50% PP 50% mica | PPm (t = 100 $\mu$m) | UNIFILO needle no. 6 | 1 | 6845 | 115 | 0.8 | 12 | 220 | AVERAGE |
| 1D | 40% PP 20% mica 30% sGB 10% talc (matrix $F\phi$) | PPm (t = 100 $\mu$m) | UNIFILO needle no. 6 | 1 | 5200 | 119 | 1 | 10 | 160 | GOOD |
| 3A | $F\phi$ | PPm | UNIFILO needle no. 1 | 1 | 5300 | 100 | 1.1 | 11 | 180 | GOOD |
| 3B | $F\phi$ | PPm | UNIFILO needle no. 4 | 1 | 5100 | 85 | 1.1 | 14 | 200 | POOR |
| 3C | $F\phi$ | PPm | UNIFILO standard | 1 | 5400 | 120 | 1.2 | 19 | 350 | POOR |
| 2A | $F\phi$ | OREVAC F (viscous PPm) | UNIFILO needle no. 6 | 1 | 5000 | 110 | 1.1 | 11 | 175 | POOR |
| 1C | 40% PP 20% mica 20% sGB 20% talc (matrix F1) | PPm (t = 100 $\mu$m) | UNIFILO needle no. 6 | 1 | 5200 | 115 | 1 | 10 | 173 | EXCELLENT |
| 1E | F1 | PPm (t = 140 $\mu$m) | UNIFILO needle no. 6 | 1 | 4500 | 105 | 1.2 | 12 | 185 | EXCELLENT |
| 1F | F1 | PPm (t = 70 $\mu$m) | UNIFILO needle no. 6 | 1 | 5700 | 120 | 1 | 10 | 170 | EXCELLENT |
| 1H | F1 | NO BINDER (t = 0 $\mu$m) | UNIFILO needle no. 6 | 1 | 4300 | 70 | 1.1 | 14 | 220 | POOR |
| 1I | F1 | PPm (t = 30 $\mu$m) | UNIFILO needle no. 6 | 1 | 5800 | 120 | 1.1 | 12 | 190 | AVERAGE |
| 2B | $F\phi$ | fluid EVA | UNIFILO needle no. 6 | 1 | 4200 | 70 | 1.2 | 12 | 180 | POOR |

TABLE-continued

| Ex | LAYER 1 surface | LAYER 2 | LAYER 3 | LAYER 4 | LAYER 5 | | | | | | |
|---|---|---|---|---|---|---|---|---|---|---|---|
| 4A | 55% PET 20% mica 20% sGB 5% hGB | PET T86 (t = 130 μm) (t = 100 μm) | UNIFILO needle no. 6 | | | 1 | 9200 | 110 | 1.2 | 12 | 220 | EXCELLENT |
| 1G | F1 | — | | 0 | | 1 | 3500 | 32 | 0.8 | 3 | 60 | EXCELLENT |
| 5A | F1 | PPm (t = 200 μm) | UNIFILO needle no. 6 | F1 (t = 650 μm) | F1 (t = 650 μm) | 5 | 5000 | 110 | 1.2 | 13 | 210 | EXCELLENT |
| 7A | F1 | F1 | PPm (t = 100 μm) | UNIFILO needle no. 6 | PPm (t = 100 μm) | 2 | 3600 | 56 | 1.1 | 22 | 230 | GOOD |
| 6A | F1 | 100% PP (t = 650 μm) | UNIFILO needle no. 6 | 100% PP (t = 650 μm) | UNIFILO needle no. 6 | 3 | 3200 | 68 | 1.3 | 34 | 250 | POOR |
| 8A | Fφ | 80% PP 20% sGB (t = 650 μm) | UNIFILO needle no. 6 | 100% PP (t = 650 μm) | UNIFILO needle no. 6 | 4 | 3800 | 70 | 1.3 | 14 | 220 | POOR |

We claim:

1. Stampable reinforced thermoplastic sheet, at least one face of which comprises, from the outside to the inside, at least three successive layers abc, in which:

a is a matrix comprising a thermoplastic resin reinforced by at least two different fillers selected from the group consisting of lamellar type fillers, spherical fillers, and substantially spherical type fillers, the viscosity of the matrix, measured using a capillary viscometer, at the temperatures at which the sheets are produced and used, and at a shear rate of 20 $s^{-1}$, being between 450 and 2000 Pa.s;

b is an interfacial binder chemically compatible with the thermoplastic resin of the matrix a, the viscosity of which, measured under the same conditions as that of the matrix a, is between 10 and 350 Pa.s, and c is a reinforcement consisting of a needled glass mat.

2. Sheet according to claim 1, wherein the reinforcing fillers in the thermoplastic resin have an average particle size of less than or equal to 80 μm.

3. Sheet according to claim 1, wherein the reinforcing fillers in the thermoplastic resin have an average particle size of between 1 and 40 μm.

4. Sheet according to claim 1, wherein the fillers of lamellar type are chosen from mica, wollastonite and whiskers.

5. Sheet according to claim 1, wherein the fillers of spherical or substantially spherical type are chosen from talc, solid or hollow glass beads and $CaCO_3$.

6. Sheet according to claim 1, the two faces of which being made up, from the outside towards the inside, of at least three successive layers abc.

7. Sheet according to claim 1, which comprises one or more thicknesses of a structure comprising four successive layers abca.

8. Sheet according to claim 1, wherein the thermoplastic resin of the matrix a is reinforced by at least three different fillers.

9. Sheet according to claim 1, which comprises 30 to 80% by weight of thermoplastic resins making up the matrix a.

10. Sheet according to claim 1, which comprises 14 to 50% by weight of reinforcing fillers in the matrix a.

11. Sheet according to claim 1, which comprises 15 to 40% by weight of glass mat forming the reinforcement c.

12. Sheet according to claim 1, which comprises 53 to 90% by volume of thermoplastic resins making up the matrix a.

13. Sheet according to claim 1, which comprises one or more thicknesses of a structure comprising five successive layers abcba.

14. Sheet according to claim 1, which comprises 27 to 35% by volume of reinforcing fillers in the matrix a.

15. Sheet according to claim 14, which comprises at least 30% by volume of reinforcing fillers in the matrix a.

16. Sheet according to claim 1, which comprises 8 to 20% by volume of glass mat forming the reinforcement c.

17. Sheet according to claim 16, which comprises 8 to 12% by volume of glass mat forming the reinforcement c.

18. Sheet according to claim 1, wherein the needled glass mat forming the reinforcement c has a mass per unit surface area of between 225 and 900 g/m$^2$, a mass per unit length of between 10 and 125 tex and threads having average diameters of between 5 and 30 μm.

19. Sheet according to claim 18 wherein: the needled glass mat forming the reinforcement c has a mass per unit surface area of between 300 and 600 g/m$^2$; and the needled glass mat forming the reinforcement c has a mass per unit length of between 10 and 25 tex and threads having average diameters of between 10 and 20 μm.

20. Sheet according to claim 1, wherein the thermoplastic resins forming the matrix a are chosen from the group consisting of polyester resins, polyamide resins, polyolefin resins,
aromatic polysulphone resins,
polyester polyacetal sulphone resins,
polycarbonate resins,
polyether-imide resins,
polyester-ketone resins,
ABS resins, and
acrylic resins.

21. Sheet according to claim 20 wherein:
thermoplastic resins are selected from the group consisting of polyethylene terephthalate (PET), polybutylene terephthalate (PBT), polypropylene (PP), polyethylene (PE), polymethylpentene; polysulphone, polyallyl sulphone, aliphatic polyamides PA-6, PA-6/6, PA-11, PA-12, PA-12/12 and their mixtures or copolymers and alloys based on PP/PA-6 or PP/PA-6.6.

22. Moulded articles and parts obtained by stamping one or more sheets according to claim 1,
at least one of the surfaces of these articles and parts being made up, from the outside to the inside, of at least three successive layers abc, in which:
a is a matrix comprising a thermoplastic resin reinforced by at least two different fillers selected from the group consisting of lamellar type fillers, spherical fillers, and substantially spherical type fillers,
b is an interfacial binder chemically compatible with the thermoplastic resin of the matrix a, and having, with respect to the latter, a lower viscosity at the temperatures at which the sheets are produced and used; and
c is a reinforcement consisting of a needled glass mat.

* * * * *